United States Patent [19]
Mavraganis et al.

[11] Patent Number: 5,521,914
[45] Date of Patent: May 28, 1996

[54] SWITCHED ACCESS TO FRAME RELAY

[75] Inventors: Theo Mavraganis, Ottawa; Keith Allan, Nepean, both of Canada

[73] Assignee: Newbridge Networks Corporation, Kanata, Canada

[21] Appl. No.: 278,318

[22] Filed: Jul. 21, 1994

[51] Int. Cl.[6] ................................ H04Q 11/04
[52] U.S. Cl. ............... 370/60; 370/85.13; 370/94.1; 370/110.1
[58] Field of Search ............... 379/60, 94.1, 110.1, 379/85.13; 370/220, 240

[56]   References Cited

U.S. PATENT DOCUMENTS

| | | | |
|---|---|---|---|
| 4,894,822 | 1/1990 | Buhrke et al. | 370/60 |
| 4,970,721 | 11/1990 | Aczel et al. | 370/94.1 |
| 5,210,748 | 5/1993 | Onishi et al. | 370/85.13 |
| 5,268,903 | 12/1993 | Jones et al. | 370/110.1 |
| 5,410,754 | 4/1995 | Klotzbach et al. | 370/94.1 |

Primary Examiner—Douglas W. Olms
Assistant Examiner—Shick Hom
Attorney, Agent, or Firm—Marks & Clerk

[57]   ABSTRACT

An arrangement is disclosed for providing switched access to a packet-based network. The arrangement comprises an ISDN switch connected to terminal units via ISDN links, a frame relay switch, and a TDM trunk connecting the frame relay switch to the ISDN switch. The TDM trunk has circuits that constitute a hunt group for switched access to the network and perform signaling termination.

5 Claims, 2 Drawing Sheets

SWITCHED ACCESS TO FRAME RELAY

BACKGROUND OF THE INVENTION

This invention relates to a method of providing ISDN switched access to a packet-based network, such as frame relay, offering PVC (Permanent Virtual Connection) services.

Frame relay is a technology for access to wide area networks. The frame relay protocol operates at a sublayer of the data link layer, which provides the minimum functionality needed to take advantage of the statistical properties of the communication. Unlike preexisting protocol suites in use in general topology subnetworks, it also performs relaying, and multiplexing at this sublayer. Other data link layer functions are provided only in systems connected to the edges of the frame relay subnetwork.

One of the requirements of telephone companies is to provide switched access to a frame relay network. Switched access allows calls to be set-up when needed allowing access by many callers. This brings the cost down to the user.

The prior art solution is to provide access using a dedicated PVC (Permanent Virtual Connection) in the Frame Relay network. The main shortcoming of this technique is that it provides access even when there is no traffic to send. This increases the cost of the access.

SUMMARY OF THE INVENTION

In accordance with the present invention, switched access is provided via a TDM, e.g. a T-1, trunk, the circuits on the trunk constituting a hunt group for switched access and performing signaling termination. Signaling termination is done using a common signaling technique known as E&M.

The invention thus provides call access from an ISDN network to a Frame Relay network or other circuit type. Although described in connection with Frame Relay circuits, the invention is applicable to any other circuit type.

BRIEF DESCRIPTION OF THE DRAWINGS

The invention will now be described in more detail, by way of example only, with reference to the accompanying drawings, in which.

DESCRIPTION OF THE PREFERRED EMBODIMENTS

Figure 1:
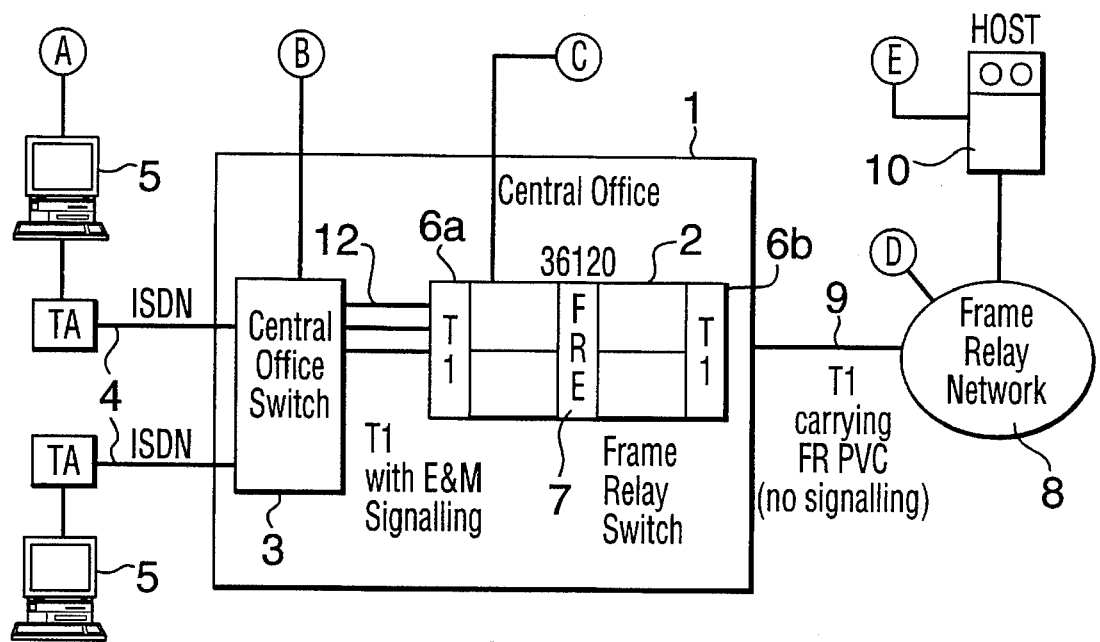
FIG. 1 is a block diagram of an arrangement showing ISDN access to a frame relay network.

In FIG. 1, a central office 1 includes a Newbridge Networks Corporation 36120 Mainstreet® frame relay switch 2 and a central office ISDN switch 3 connected via ISDN links 4 to terminals 5. Switch 2 contains T1 cards 6a, 6b connected to FRE (Frame Relay Engine) card 7. Card 6a is connected to the central office switch 3 via T1 links 12 using E & M signaling. Card 6b is connected and to frame relay network 8 over T1 link 9. Frame relay network 8 is connected to host computer 10.

The Frame Relay Engine (FRE) card 7 is a card designed for high performance frame relay. It is a multi-processor card with a 68340 general purpose control processor and two 68EC040 processors used for frame switching and I/O.

The FRE card is a component of the MainStreet® 36120 Packet Transfer Exchange (PTX) system. The 36120 consists of one or more 3600/45 shelves, Fastbus Interconnect Panels or wiring hubs, and up to 64 FRE cards. All FRE cards in a single 36120 switch are interconnected in order to create a large frame relay switching system. A fully configured 36120 system has a maximum capacity of 100,000 fps of frame relay traffic and 256 Mbps of access channel bandwidth (128 T1/E1 interfaces or equivalent).

The FRE card uses a 100 Mbps interface implemented with FDDI wiring hub or FASTbus™ technology as described in our co-pending application Ser. No. 08/278, 328, filed on even date herewith, the contents of which are herein incorporated by reference. The FASTbus is used to interconnect the FRE cards 7 within a 36120 system.

The FRE card 7 supports a double data bandwidth WAN interface when an appropriate Expander card is installed in the node. With double data bandwidth, each FRE card has access to 4 Mbps of WAN bandwidth and up to 62 WAN circuits. WAN circuits can be configured for frame relay or CPSS. Frame relay circuits can run at superrate speeds.

The FRE card 7 has its own local database, Node Management Terminal Interface (NMTI) and Network Control Interface (NCI). The local database is stored in Non-Volatile Memory (NVM) and contains all application specific configuration information. Integral NMTI is used for user configuration of the local database. The control card is responsible for slot configuration, physical layer circuit configuration and WAN side connections.

The main function of the FRE card 7 is to switch frames arriving on an incoming logical data link to an outgoing logical data link or to another FRE card via the FASTbus interface. In this manner, logical data links are joined together through a frame relay network to create Permanent Virtual Connections (PVCs). PVCs are end-to-end logical connections which extend between two user/network interfaces. A single PVC may pass through several frame relay switching nodes.

ISDN signaling is used between terminals 5 and central office switch 3 to achieve switched access. The central office switch 3 terminates all ISDN signaling. Based on the called number, the central office switch 3 then selects a T1 DS-0 channel on the T1 trunk 12 from its hunt group and uses T1 E&M signaling to initiate a call on the T1 DS-0 between the central office switch 3 and switch 2, which terminates the T1 E&M signaling at the T1 interface 6a and indicates that the DS-0 channel is in use.

The T1 DS-0 channel is previously cross connected to the FRE card 7, and the frame stream on the FRE card 7 is previously configured for all required PVCs allowing the data to travel from points the FRE card 7 to the host computer 10.

When a call is initiated, ANSI T1.617 annex D unidirectional protocol is used on the access lines A (points A to C and E to D in FIG. 1). ANSI T1.617 annex D bidirectional protocol is used within the backbone frame relay network (points C to D). On each of the T1 DS-0 access lines, an identical DLCI (Data Link Connection Identifier) an address field used to identify a logical data link multiplexed within a physical channel) is used to represent each distinct host to simplify the end terminal configuration. PVCs (Permanent Virtual Connections) are configured from each access DS-0 to all allowed hosts (using the same source DLCI).

With this arrangement, the ISDN (or SDS-56) user can have frame relay PVC service by dialing into the frame relay network. This is achieved by the user dialing an address, corresponding to the interworking function (IWF) which bridges the ISDN or SDS-56 network and the frame relay networks. The frame relay service parameters such as DLCI, maximum frame size, and Committed Information Rate (CIR) are pre-assigned to the end-user (i.e., ISDN or SDS-56 user) at service subscription time. The end-user may be assigned one or more DLCI(s) corresponding to PVC(s) which are connected to the end-user's intended destinations. On the ISDN access, frame relay information is carried over ISDN B-channels. For SDS-56 service, this information is carried over 56 kbps channels.

Figure 2:
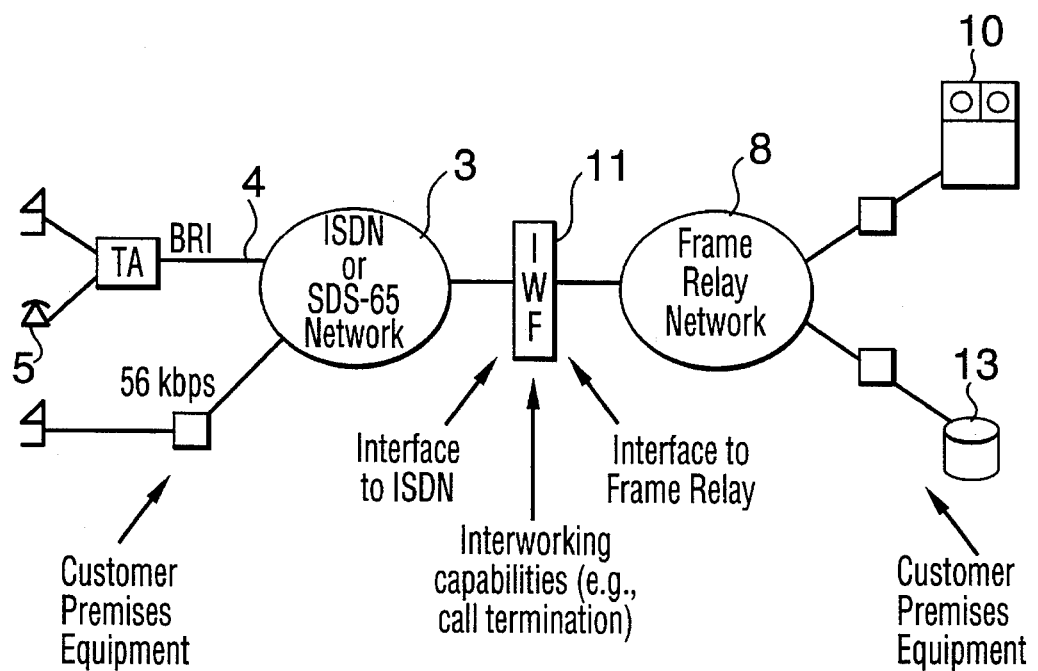
FIG. 2 shows the architecture of an arrangement in accordance with the invention.

To access this service, the ISDN or SDS-56 user first places a circuit-switched call to the IWF 11 (FIG. 2). The IWF 11 must perform call termination to accept or reject a call request by the end-user. Following call acceptance by the IWF, the end-user transmits frame relay frames towards the frame relay network. At this stage, the ISDN or SDS-56 network is transparent to the transfer of frame relay information.

Through this service, the end-user may have switched (as opposed to dedicated) access to frame relay PVC service. This service may also be used to provide back-up switched access to users of the frame relay PVC service who have dedicated access.

The IWF 11 provides an interworking function to map the user information from the circuit-mode data into the frame relay format. The ISDN (or the SDS-56) user dials the IWF 11 and transmits user information over ISDN B-channels (or 56 kbps channels, in the case of SDS-56). The information carried through the ISDN or SDS-56 network may be circuit-switched or it may use a protocol (e.g., Point-to-Point Protocol) between the ISDN Terminal Adapter (TA) and the IWF. The ISDN or the SDS-56 user is offered a circuit-mode data service and the remote user is provided with frame relay PVC service.

In this service, the ISDN (or the SDS-56) user places a circuit-switched data call to the IWF. The IWF 11 here may be viewed as any other user of ISDN (or SDS-56) circuit-switched data service. The circuit-mode data transfer rate may be 56 kbps or 64 kbps. The frame relay parameters such as DLCI, maximum frame size, and CIR should be set appropriately at the IWF for seamless operation of the service. The following points should be noted for this service:

1. The ISDN (or SDS-56) user does not subscribe directly to frame relay service. Rather, frame relay information transfer begins at the IWF.

2. The ISDN TA is one that is normally used today for circuit-mode data.

3. The IWF must perform protocol conversion (e.g., from PPP to FR).

4. The user information is routed from the source to the destination by mapping (at the IWF) the Directory Number of ISDN (or SDS-56) user terminal to a DLCI, corresponding to a pre-designated destination on the frame relay network.

Through this service, an end-user that subscribes to ISDN circuit-mode data (or SDS-56) can communicate with an end-user subscribing to the frame relay PVC service.

The switched access to Frame Relay PVC requires an interworking function (IWF) 11 that can bridge the switched digital networks (ISDN or SDS-56) and the Frame Relay networks. FIG. 2 illustrates the architecture for switched access to Frame Relay PVC service.

As shown in FIG. 2, the interworking function unit 11 (IWF) is used to bridge the ISDN (or SDS-56) network and the frame relay network. In this architecture four areas are impacted, namely: the Customer Premises Equipment (CPE) 13, the IWF 11, the interface between ISDN and the IWF, and the interface between the IWF 11 and the frame relay network 8.

The IWF 11 and CPE 13 have different requirements for the two services, Frame Relay PVC with switched access, and Circuit-mode data and Frame Relay PVC. For Frame Relay PVC with switched access, the CPE 13 (e.g., Terminal Adapter) must support frame relay protocol. For circuit-mode data and Frame Relay PVC interworking, the CPE (13 e.g., TA) is one that is used for circuit-mode data. For the latter service, the IWF 11 must provide protocol conversion (e.g., from PPP to frame relay protocol).

The implementation options for the interface between the ISDN and the IWF include: ISDN Basic Rate Interface (BRI), ISDN Primary Rate Interface (PRI), and (non-ISDN) channelized DS1.

The implementation options for the interface between the IWF and the frame relay network include: channelized DS1 (carrying 24 56/64 kbps digital channels), and unchannelized DS1 (a single 1.536 Mbps digital channel).

Figure 3:
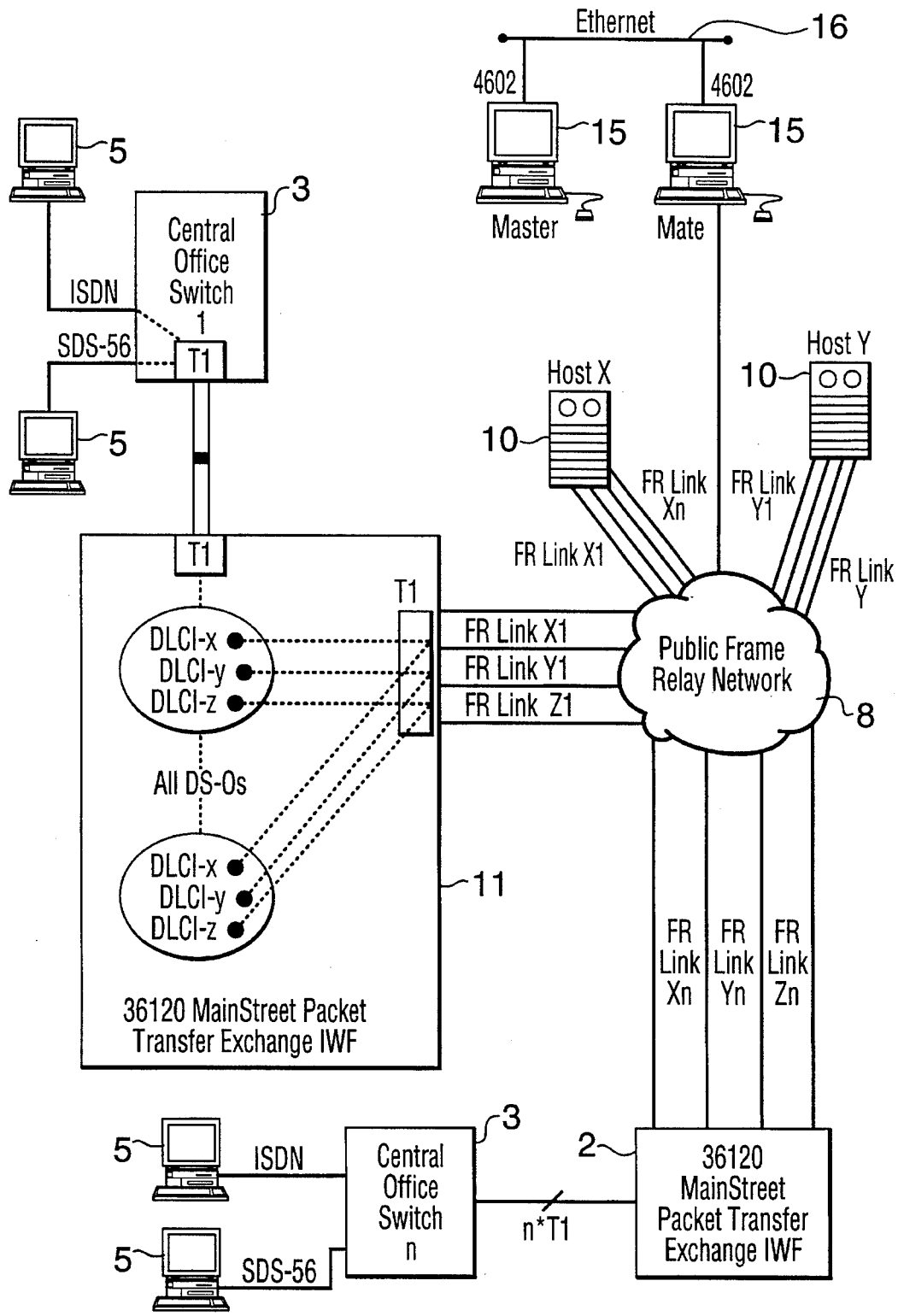
FIG. 3 shows a more detailed embodiment of an arrangement in accordance with the invention.

A particular embodiment that allows ISDN and SDS-56 circuit-switched access to frame relay PVC services offered on the 36120 MainStreet® platform is shown in FIG. 3.

The embodiment shown in FIG. 3 provides an IWF 11, consisting of a Newbridge Networks MainStreet® 36120 Packet Transfer Exchange to bridge the ISDN (or SDS-56) network to the frame relay network. The IWF implementation uses a Packet Transfer supporting AB voice signaling response codes utilizing Robbed Bit Signaling on a DS0 basis. This signalling choice provides call setup, tear down, and status.

As shown in more detail in FIG. 3, the system gives ISDN subscribers 5 switched access to public frame relay network 10, which may be connected, for example, to host computers 10, or terminals 15 linked by an Ethernet 16.

The type of digital interface supported between the IWF 11 and the frame relay network is DS-1. For the channelized interface, N×48/56 Kbps rates are supported. The maximum user information rate per access channel for interfacing to the ISDN network is 64 Kbps. It is assumed that the interface between the IWF 11 and the ISDN (or SDS-56) access will be provided by the DMS-100 or 5ESS Central Office Switch.

The interface modularity between the ISDN switch 3 and the IWF is in increments of N×8 Kbps up to 1.536 Mbps. Since the interface between the ISDN switch and the IWF 11 is a channelized 1.544 Mbps Voice Trunk, the number of hunt groups supported is dependent upon the capabilities of the CO Switch (DMS/5ESS etc.). Therefore this number can range from 1 DS0 to 24 DS0's per T1 trunk, or it can be as many as 24×N, N=number of T1 trunks not to exceed 128 T1's per 36120.

The hunt groups supported on the ISDN switch block calls to DS0's when the calling party is not authorized to call that number. Each DS0 in the IWF hunt group can have multiple DLCI's with different end points to various applications. The calling parties programmed DLCI determine what end point application they will access, i.e., Internet, Campus LAN, etc. The PVC's are all predetermined in the IWF 11, and connect to predetermined PVC connections in the Public Frame Relay Network.

We claim:

1. A digital communications system comprising:

a frame relay network capable of establishing calls over permanent virtual connections between end users having dedicated access to said network;

a plurality of frame relay customer terminal units having dedicated access to said frame relay network;

a central office comprising a frame relay switch connected to said frame relay network for providing access thereto, and an ISDN switch, said ISDN switch being capable of performing a circuit-switching function and being connected to said frame relay switch via a TDM trunk, said TDM trunk having circuits including a hunt group for performing signaling termination and providing switched access to said frame relay switch through said ISDN switch;

a plurality of ISDN end-user terminals connected to said ISDN switch over ISDN lines; and said frame relay switch in said central office being a packet transfer exchange that provides an interworking function to map user information from circuit-mode data on said ISDN lines into frame relay format and add a preassigned DCLI (Data Link Connection Identifier) for an ISDN end-user's intended destination;

whereby by placing a circuit-switched call to said frame relay switch through said ISDN switch, ISDN users can have switched access to frame relay service and communicate directly with said frame relay customer terminal units over permanent virtual connections established in said frame relay network.

2. A digital communications system as claimed in claim 1, wherein said TDM trunk is a T1 Trunk.

3. A digital communications system as claimed in claim 1, wherein said signaling termination is performed by said trunk circuits using E & M signaling.

4. A digital communications system as claimed in claim 2, wherein ISDN signaling is used between said ISDN end-user terminals and said ISDN switch, said ISDN switch terminating all ISDN signaling.

5. A digital communications system as claimed in claim 2, wherein a permanent virtual connection is configured from each DS-0 channel on said trunk to a respective dedicated host on said frame relay network.

* * * * *